Figure 1:
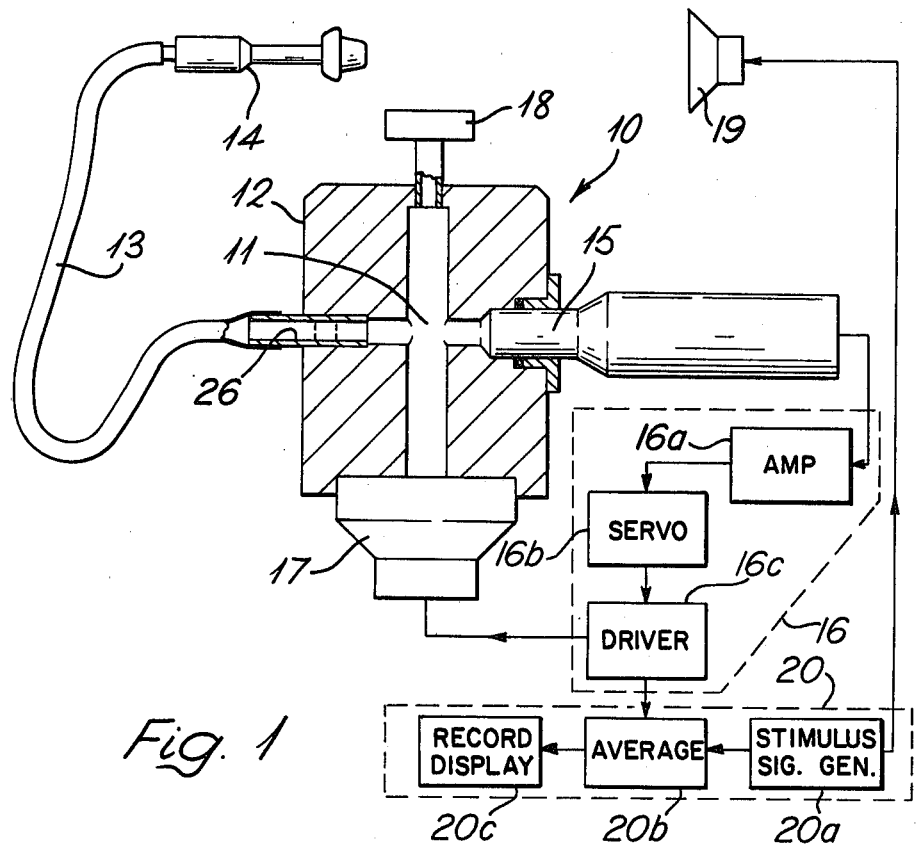

United States Patent [19]

Marchbanks

[11] 4,413,634
[45] Nov. 8, 1983

[54] LOW VOLUME CHANGE DETECTION

[75] Inventor: Robert J. Marchbanks, Wallingford, England

[73] Assignee: National Research Development Corporation, London, England

[21] Appl. No.: 259,240

[22] Filed: Apr. 30, 1981

[30] Foreign Application Priority Data

May 1, 1980 [GB] United Kingdom ............... 8014390

[51] Int. Cl.$^3$ ........................... A61B 5/10; A61B 5/12
[52] U.S. Cl. ..................................... 128/746; 73/585; 73/149; 73/701; 73/716
[58] Field of Search ................. 128/746; 73/585, 701, 73/716, 149, 589; 179/1 N

[56] References Cited

U.S. PATENT DOCUMENTS

| 3,395,697 | 8/1968 | Mendelson | 128/746 |
| 3,757,769 | 9/1973 | Arguimbau et al. | 128/746 |
| 4,009,707 | 3/1977 | Ward | 128/746 |
| 4,014,320 | 3/1977 | Richards | 128/746 |
| 4,057,051 | 11/1977 | Kerouac | 128/746 |
| 4,079,198 | 3/1978 | Bennett | 128/746 |
| 4,201,225 | 5/1980 | Bethea et al. | 128/746 |
| 4,237,905 | 12/1980 | Keller et al. | 128/746 |
| 4,289,143 | 9/1981 | Canavesio et al. | 128/746 |

Primary Examiner—Kyle L. Howell
Assistant Examiner—John C. Hanley
Attorney, Agent, or Firm—Cushman, Darby & Cushman

[57] ABSTRACT

Low volume flow measurement apparatus developed for hearing dysfunction diagnosis but also suited to other applications comprises means (10) defining a cavity operably communicable with the variable volume, a D.C. microphone (15) responsive to ambient pressure changes in the cavity due to variations in said volume, and a reference diaphragm (17) operably connected with the cavity and moveable under servo-control responsive to the microphone to maintain the cavity pressure constant. The cavity will normally have a vent valve (18) and in non-hearing application may be coupled with the subject volume by a plunger seal. For hearing diagnosis the apparatus is suitably carried by a helmet (21) or harness with a headphone on the opposite side for sound stimulus application, the helmet itself being at one end of a boom (22) with a counterweight (23).

8 Claims, 4 Drawing Figures

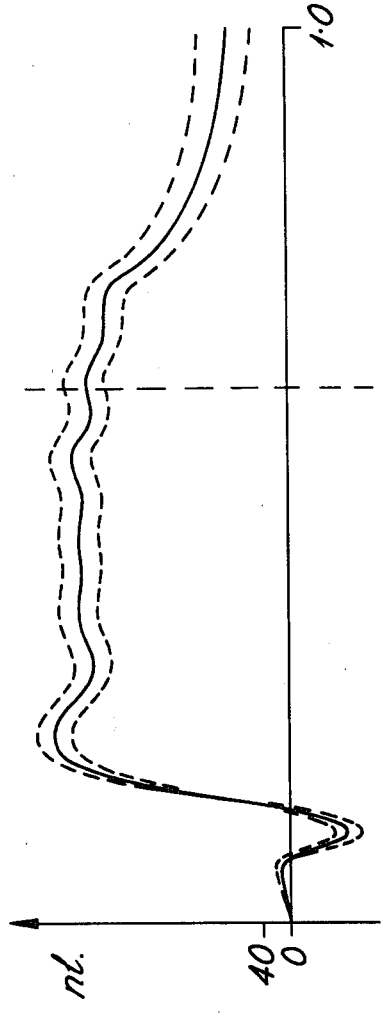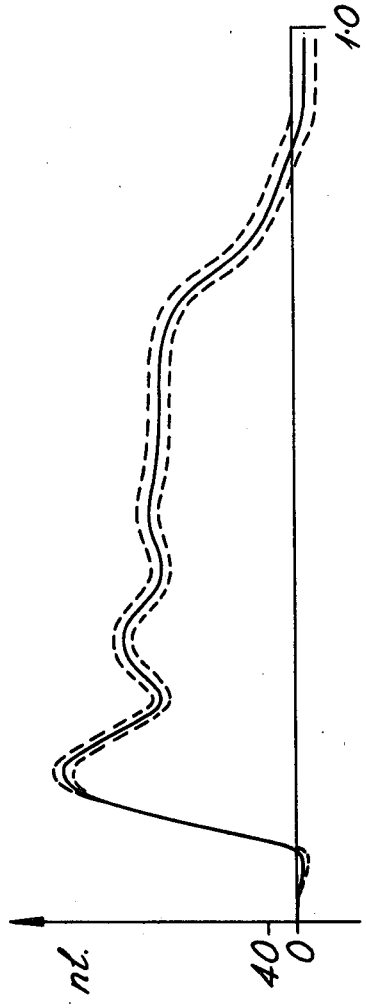

LOW VOLUME CHANGE DETECTION

This invention concerns low volume flow measurement, typically of the order of nanoliters per second.

In general functional terms the invention provides apparatus for this purpose having an ultra low input impedance which allows measurement to be made under nearfree field conditions, that is to say without exerting a backpressure on the flow undergoing measurement. Recent development of this apparatus indicates that it is suited to application in a variety of situations in different scientific and technological fields. However, the initial conception and earlier development of the apparatus concerned study of displacements of the human eardrum and it is appropriate and convenient to describe the invention principally in this context.

Hearing dysfunction diagnosis and research have relied to a large extent in the past decade on acoustic impedance measuring techniques, commonly with the use of electroacoustic impedance bridge instruments. Clinical application of these techniques generally involves, for example, tests to evaluate the reflex function of the middle ear musculature. In this particular instance one of the external ear canals of the subject is sealably coupled with the impedance measuring device, whereupon stimuli are presented to the ear which elicit reflex activity and such activity is detected from the consequent acoustic impedance variations in the canal, usually by way of a microphone connected to a cavity in the device which cavity communicates with the canal. However, although these techniques provide useful data, various practical limitations arise. For example, the pressure variations in the canal caused by reflex-induced movement of the eardrum can exert a back pressure on the eardrum and so modify its response to the reflex, the individual eardrum canal volume must be known to allow a full interpretation of the acoustic impedance measurements, and the techniques in question essentially entail a steady state measurement and are not suited to the measurement of reflex transients.

Acoustic impedance measuring techniques can also be used in other situations involving impedance variation caused by eardrum movement as a result of other physiological phenomena than reflex activity, but the above limitations still remain.

The present invention serves to obviate such limitations and provides generally similar apparatus but with the microphone being of a D.C. form for response to ambient pressure changes rather than sound pressure level variations, and with the addition of a reference diaphragm operably connected with the cavity amd moveable under servo-control responsive to the microphone to maintain the cavity pressure constant. The operation of the invention is accordingly such that the application of an acoustic stimulus of reflex intensity or some other activity causes eardrum movement to produce a fluctuation in the total volume of the canal/-cavity space and initiation of an associated ambient pressure variation, while the microphone responds to this variation and controls the reference diaphragm to move and produce an equal but opposite compensating volume displacement which maintains the cavity pressure constant. The diaphragm servo-control signal therefore provides a direct measure of the eardrum volume displacement. The immediate benefits of this measurement are that it is effectively obtained in free field conditions, it is independent of the individual external canal volume, and it is obtained by an operation suited to transient situations. Moreover, eardrum volume displacement is more easily related in mechanical terms to the middle ear function than is acoustic impedance.

For a fuller understanding of the invention, one embodiment thereof will now be described by way of example with reference to the accompanying drawings, in which:

FIG. 1 diagrammatically illustrates one embodiment of apparatus according to the invention.

Figure 2:
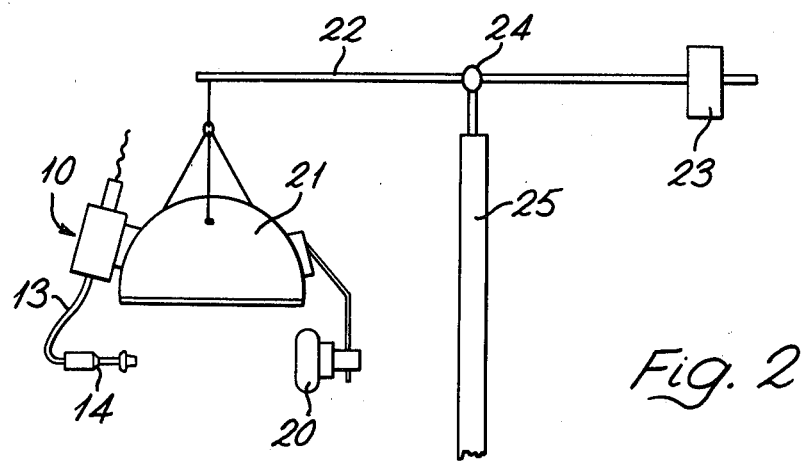

FIG. 2 similarly illustrates further apparatus for use with that of FIG. 1, and

FIGS. 3 and 4 graphically illustrate examples of measurement results obtained with the apparatus of FIGS. 1 and 2.

The embodiment of FIG. 1 comprises a cavity denoted generally at 10 and defined by intercommunicating bores 11 formed in a block 12. One end of one of the bores is connected by a flexible tube 13 with an ear seal 14 locatable in an external ear canal to couple the cavity therewith. The other end of that bore has a microphone 15 connected therein, this microphone being connected externally of the block, by way of operational circuit 16 including an amplifier, servo-control and driver respectively denoted at 16A, B and C, to a reference diaphragm 17 which is operably connected with the end of a different bore. Yet another bore has a normally-closed valve 18 connected thereto.

In operation, as evident from the introductory discussion above, an acoustic stimulus is applied to the subject, suitably by way of a loudspeaker denoted at 19. This stimulus gives rise to ear function activity causing movement of the eardrum in the ear to which the seal 14 is connected. This movement in turn initiates changes in the volume formed by the external ear canal, the tube 13 and the bores 11, and with it a change in the air pressure which is detected by the microphone 15. The circuits 16 react to the output from the microphone 15 to adjust the diaphragm 17 in such a sense and amplitude to restore the changing volume to its original size. This operation continues in a null-seeking manner relative to the microphone whenever there is an output from the microphone and the servo-control signal which results provides a direct measure of the eardrum volume displacement.

In practice, the servo-control signal of interest will, as with those in other modes and areas of physiological measurement, be accompanied by a considerable amount of noise arising from other physiological processes, such as respiration and cardiovascular activity, and extraneous sources. Moreover, signals due to muscle activity near the reflex threshold can be swamped by the accompanying noise.

In these circumstances, it is appropriate to employ the invention to provide a sequence of similar signals from repetitive events and then to average the sequence to extract the signal of interest from the noise. The basis for use of such an averaging technique is that the content of interest of the overall signal including noise is correlated and will be enhanced, whereas the noise, being relatively random in nature, will average to a value which tends to zero for an increasing number of events. Such a technique is in any case beneficial to take account of the fact that the signal of interest itself varies from one event to another, and an averaged result and standard deviation is more representative of performance.

This averaging and any other suitably established processing function can be accommodated by an appropriate computer facility denoted generally at 20. This same facility can at the same time conveniently provide stimulus-generating signals for the loudspeaker 19 in a desired sequence. In FIG. 1 the computer 20 is accordingly shown to include an acoustic stimulus signal generator 20a, and averager 20b and a recorder/output display unit 20c.

In initial development the invention has been used in association with a general-purpose hybrid computer, but further development has involved a suitable microprocessor. Also, the present development has employed a stimulus-generating loudspeaker in the form of a headphone for application in contralateral manner with the other ear of the subject to that into which the seal 14 is applied. However other stimulus arrangements can be employed, particularly ipsilateral arrangements such as by use of a miniature loudspeaker of hearing aid type operably connected with the cavity 10.

Regarding other components in FIG. 1: the ear seal 14 is of any suitable known form allowing ready interchange of canal-engaging portions for disposability and size variation, the microphone 15 preferably has a response which extends from the audio frequencies down into the infrasonic frequencies, such as is commonly used to measure shock waves emitted from aircraft, and a B & K type 2631 D.C. microphone and carrier output system has been used; the reference diaphragm 17 is suitably provided by a headphone, a TDH39 having been used in the present development to provide a volume displacement compensation capability of ±5 microliters; and the valve 18 is of any suitable form to allow venting of the canal/cavity space to atmosphere when the ear seal is first located prior to application of stimuli, and prior to ear seal removal after stimulation is completed.

A further feature of interest in the invention as so far developed is the mode of support of the apparatus relative to the patient. This is schematically illustrated in FIG. 2 and involves the use of a helmet 21 suspended at one end of a boom 22 which has a counterweight 23 at its other end and is supported through a universal joint 24 by a stand 25 at an intermediate point. The helmet carries the cavity, microphone, reference diaphragm, and valve on one side thereof with the ear seal and interconnecting tube depending therefrom for location in the adjacent ear. The loudspeaker is adjustably suspended from the opposite side of the helmet, in the form of a headphone for location against the other ear. The apparatus components on the opposite sides of the helmet are interchangeably connected thereto to allow examination of either or both ears.

The counterweight is adjustable so that the helmet is sufficiently heavy to seat firmly on the subject's head, but without being unduly heavy by virtue of the associated apparatus. This allows the subject some degree of freedom to move his head. The subject is still encouraged not to move during examination but will be more relaxed than if physically restrained at the head. This avoids undue tension in the subject leading to startle reaction which can invalidate examination results.

FIGS. 3 and 4 are examples of results obtained with use of the illustrated embodiment to measure eardrum volume displacements. These figures relate to respectively different subjects to each of whom was applied acoustic stimuli at a frequency of 1000 Hz, at an intensity 10 dB above the relevant subjects reflex threshold, for pulses of 600 ms duration, and for a sequence of twenty times. The results are the averaged value of the output signals recorded for one second each following stimulus initiation and are measured in nanoliters (nl), with the standard deviation being indicated by the broken line traces bordering the solid line trace, and the vertical broken line denoting stimulus termination.

Although the invention has been described above with reference to apparatus for hearing dysfunction diagnosis, it has been noted initially that other applications are possible. The apparatus lends itself with minimal modification to the measurement of gas evolution or absorption within a closed system and the flow of fluids through membranes or capillaries. Its use as a secondary transducer for measuring linear displacements is also a possibility.

In this last case, and in the former case where the fluid is a liquid or other form requiring non-contact with the cavity or at least with the microphone and diaphragm, the movement or volume change under study can be transmitted to the cavity by way of a plunger suitably sealing the bore 11 leading to the tube 13, such a plunger being denoted in broken line at 26 in FIG. 1. Such an arrangement provides a non-electrical linear displacement transducer for which a resolution of better than 100 Angstroms is possible. The sensitivity of this transducer is easily modified by changing the cross-sectional area of the plunger.

Also, in such other applications it may be desirable to measure volumes greater than that represented by the maximum displacement of the diaphragm. This can be accomplished in some circumstances by intermittently resetting the diaphragm to its datum position by venting the cavity through valve 18 and this can be controlled by the computer 19.

I claim:

1. Volume change detection apparatus comprising means defining a cavity, said cavity having means for communicating with a variable volume to be measured, a D.C. microphone connected with said cavity for response to fluid pressure changes therein due to variations in the variable volume, an adjustable diaphragm operably connected with said cavity, a servo-control means operably connected between said microphone and said diaphragm to adjust the latter in response to the output from the former to maintain the pressure in said cavity constant, and output means connected to said servo-control to present a signal representing the diaphragm adjustment.

2. Apparatus according to claim 1 comprising a valve for venting said cavity.

3. Apparatus according to claim 2 comprising an ear seal connected with said cavity by a flexible tube to communicate an external ear canal as said variable volume with said cavity.

4. Apparatus according to claim 3 comprising a helmet or other head-supportable structure carrying said cavity-defining means, microphone, and diaphragm, with said tube and ear seal freely depending therefrom.

5. Apparatus according to claim 4 wherein said structure also carries a loudspeaker of headphone form as a sound stimulus source to effect volumetric variation in said canal of the respective ear in response to said stimulus.

6. Apparatus according to claim 5 wherein said structure carries said loudspeaker on the opposite side to the other components carried thereby, and said loudspeaker and other components are mutually interchangeable.

7. Apparatus according to claim 4, 5 or 6 wherein said structure is suspended from one end of a boom counterweighted at its other end.

8. Apparatus according to claim 1 comprising a plunger moveably and sealably located between said cavity and said variable volume.

* * * * *